Feb. 13, 1968 E. R. HIBBARD 3,369,082

CONTROL TRACK-MONITOR SYSTEM

Filed July 13, 1964 3 Sheets-Sheet 1

INVENTOR.
EARL R. HIBBARD

BY James H. Griffin

ATTORNEY

INVENTOR.
EARL R. HIBBARD
BY James H. Griffin
ATTORNEY

Feb. 13, 1968 E. R. HIBBARD 3,369,082

CONTROL TRACK-MONITOR SYSTEM

Filed July 13, 1964 3 Sheets-Sheet 3

INVENTOR.
EARL R. HIBBARD
BY James H. Griffin
ATTORNEY

United States Patent Office 3,369,082

Patented Feb. 13, 1968

3,369,082

CONTROL TRACK-MONITOR SYSTEM

Earl R. Hibbard, Santa Clara, Calif., assignor to Ampex Corporation, Redwood City, Calif., a corporation of California Filed July 13, 1964, Ser. No. 382,178
3 Claims. (Cl. 179—100.2)

ABSTRACT OF THE DISCLOSURE

A system for reading out a scanned magnetic tape signal of a rotary head recorder to derive servo control and record monitor information therefrom. A stationary playback head is positioned to transduce the central portions of the recorded parallel tracks extending angularly across the width of the tape as the tape is moved in the direction of its length. The resulting signal may be translated into timing information for controlling the rotation of the rotary head drum of the recorder. The signal may also be employed to actuate a meter or the like for indicating the relative amplitudes of the signals recorded on adjacent parallel tracks by the successive heads of the rotary drum. The meter thus facilitates monitoring of the recorded signals during the record process and enables ready adjustment of the record currents of the respective heads, etc.

This invention relates in general to rotary head magnetic tape recorders and more particularly to a simple control track system and record current indicators for use therein.

Applicant's novel control track-monitor system will be described in connection with a helical scan magnetic tape recorder, but it is to be understood that the invention may be applied to scanning type recorders of all types. In the past, rotary head magnetic tape recorders recorded a special track of reference signal information for use in providing a time base or other control signal for various servo systems during playback. Also, no means existed whereby video recording could be monitored during the record process. As a result, setting the proper record current of a rotary head recorder was a long and tedious process; it was necessary to record a test pattern or signal and then vary the record current for each head, at the same time speaking into a microphone. Then both the audio and video were played back together and the proper video record current was determined, then adjusted by varying the gain of the head drive amplifiers to produce minimum background noise and optimum transient response.

It is a general object of this invention to provide improvements to rotary head magnetic tape recorders.

Another object of this invention is to provide means for deriving servo control signals for rotary head magnetic tape recorders from the actual signal recorded rather than from some special track of reference signal information.

Another object of this invention is to provide means for monitoring rotary head magnetic tape recorder signals.

Another object of this invention is to provide means for quick and easy adjustment of the record current of the rotary head magnetic tape recorder.

Another object of this invention is to provide means for deriving an immediate indication of clogged heads or other failure of a scanning type tape recorder during the recording process.

In the achievement of the above objects and as a feature of applicant's invention, there is provided a system wherein a stationary head is mounted at the proper angle and in the proper position to read out a scanned magnetic tape recorder signal and to derive servo control and record monitor information therefrom. The particular characteristics of the signal being read out are used to provide the servo control and monitor information desired; for example, in a helical scan tape recorder, the output from the stationary head is an RF envelope which contains time-position information regarding the recorded signal. This information can be used in a phase comparator servo system for controlling the phase of either the scanning head drum or the capstan of the tape recorder to assure registration of the rotating head with the recorded tracks during playback. At the same time, some conventional form of meter can be used to indicate the relative output amplitude of signals transduced by the same stationary head. Thus, while in the past it was necessary to make a test recording with various levels of record current in order to set the correct record current, the use of a stationary head for monitoring purposes will make it possible to adjust record current quickly and easily during the course of a very short test recording. Also, observation of the same meter during the course of recording program material will give an immediate indication of any component failure or head clogging during the record process.

The above described stationary head principle can be adapted for use on transverse rotary head magnetic tape recorders by mounting the stationary head on a vibrating arm. The vibration of the head and the arm must be in a direction parallel to the recorded tracks, and the amplitude of vibration must be sufficient for the reproduce gap to span at least several wave lengths of the recorded FM signal.

Other objects and features of this invention and a fuller understanding thereof may be had by referring to the following description and claims taken in conjunction with the accompanying drawings, in which:

Figure 1:
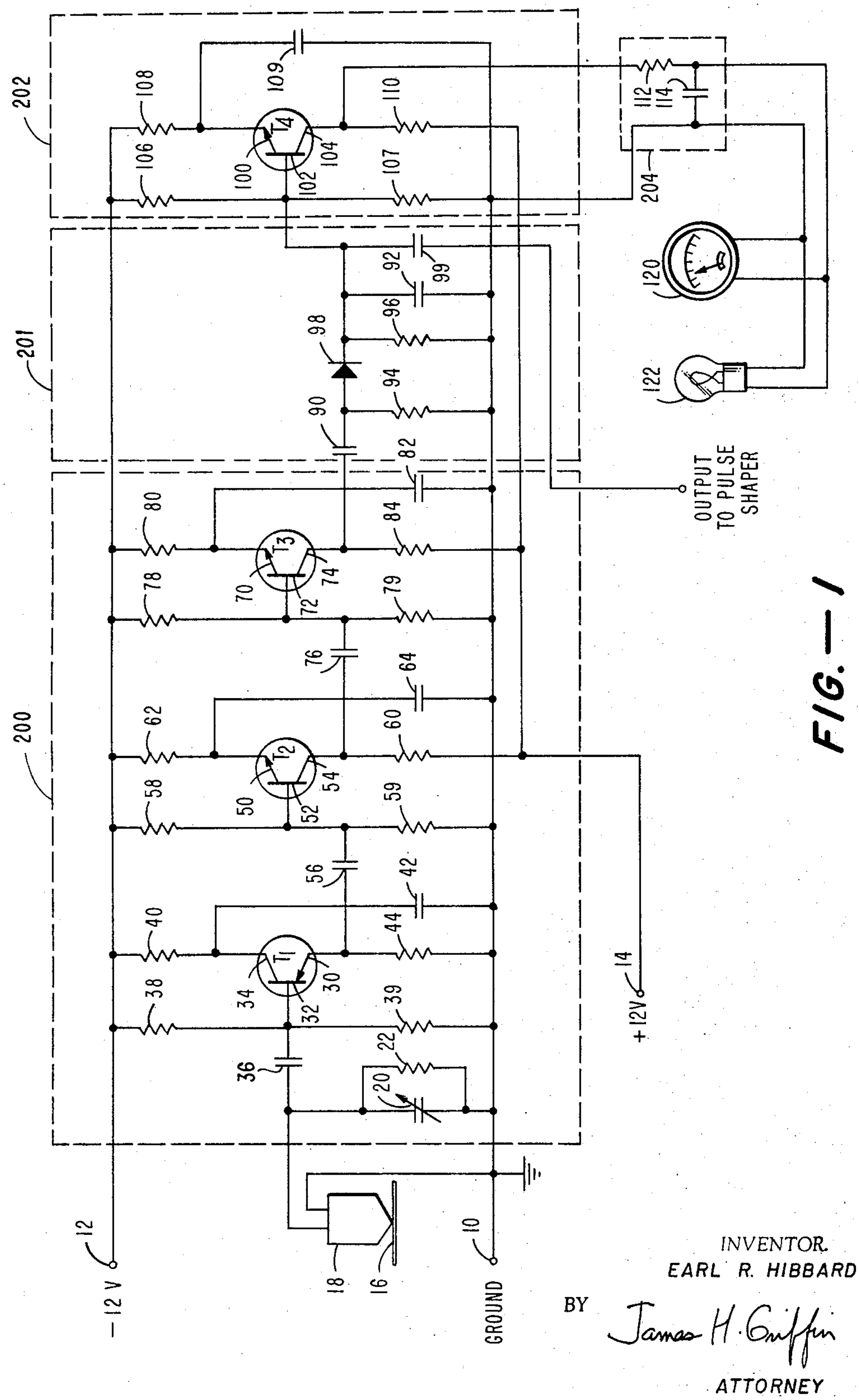
FIGURE 1 is a schematic of a preferred embodiment of applicant's invention.

Referring to FIGURE 1, it will be seen that the schematic of applicant's preferred circuit has a ground terminal 10, a negative power supply terminal 12, and a positive power supply terminal 14. For purposes of illustration herein, the negative power supply 12 is specified as —12 v. DC and the positive power supply 14 is specified as +12 volts DC. Input signals to this circuit are transduced from the tape 16 by a stationary head 18, one winding lead of which is coupled to ground 10. A tuning circuit comprising the parallel combination of a variable capacitor 20 and the head 18 is coupled in parallel with a damping resistor 22.

A transistor T1 having an emittor 30, base 32, and collector 34 has its base 32 coupled through a DC blocking capacitor 36 to the head 18. Two resistors 38 and 39 coupled between the negative power supply 12 and ground 10 hold the base 32 to a certain DC operating level. The collector 34 of the transistor T1 is coupled to the negative power supply 12 through a resistor 40 and is coupled to ground through a capacitor 42. The emitter 30 of the transistor T1 is coupled to ground 10 through a resistor 44. The transistor T1, being employed as an emitter-follower, presents a high input impedance to the head and parallel tuned circuit, while presenting very low output impedance to the amplifying circuitry to follow.

The first amplification stage comprises a transistor T2 having emitter 50, base 52, and collector 54. The base 52 of the transistor T2 is coupled to the emitter 30 of the transistor T1 through a capacitor 56 and is held at a constant DC operating level by two resistors 58 and 59. The collector 54 of the transistor T2 is coupled to the positive power supply 14 through a resistor 60. The emitter 50 of the transistor T2 is coupled to the negative power supply 12 through a resistor 62 and to ground through a capacitor 64.

The second amplification stage in the playback preamplifier comprises a transistor T3 having emitter 70, base 72, and collector 74. The base 72 is coupled to the collector 54 of the transistor T2 through a coupling capacitor 76 and is held at a certain DC operating level by two resistors 78 and 79 coupled between the negative power supply 12 and ground 10. The emitter 70 of the transistor T3 is coupled through a resistor 80 to the negative power supply 12 and to ground 10 through a decoupling capacitor 82. The collector 74 of the transistor T3 is coupled through a resistor 84 to the positive power supply 14.

The output signal on the collector 74 of the transistor T3 is rectified by a network comprising a capacitor 90, resistors 94 and 96, and the diode 98. Being placed in a series circuit running from the positive power supply 14 through the resistor 84 then through the resistor 94 to ground 10, the capacitor 90 remains charged to a certain positive potential, so that it raises the level of RF signals appearing on the collector 74 of the transistor T3. The parallel resistor 96 and capacitor 92 smooth the RF into a variable DC voltage representative of the former RF envelope. Thereafter the signal may be coupled through a capacitor 99 to the pulse shaper of the head drum motor control servo.

The transistor T4 having emitter 100, base 102, and collector 104 has its base 102 coupled to receive the output from the filtering network. Two resistors 106 and 107 coupled between the negative power supply 12 and ground 10 hold the base 102 at a constant DC operating level. The emitter 100 is coupled through a resistor 108 to the negative power supply and through a capacitor 109 to ground 10. The collector 104 of the transistor T4 is coupled through a resistor 110 to the positive power supply 14. The output from the transistor T4, appearing on its collector 104, is filtered by a network comprising a resistor 112 and a capacitor 114. Following this final filtration, the signal may be applied to a meter 120, or an electric light 122, or other such monitoring devices.

Figure 2:
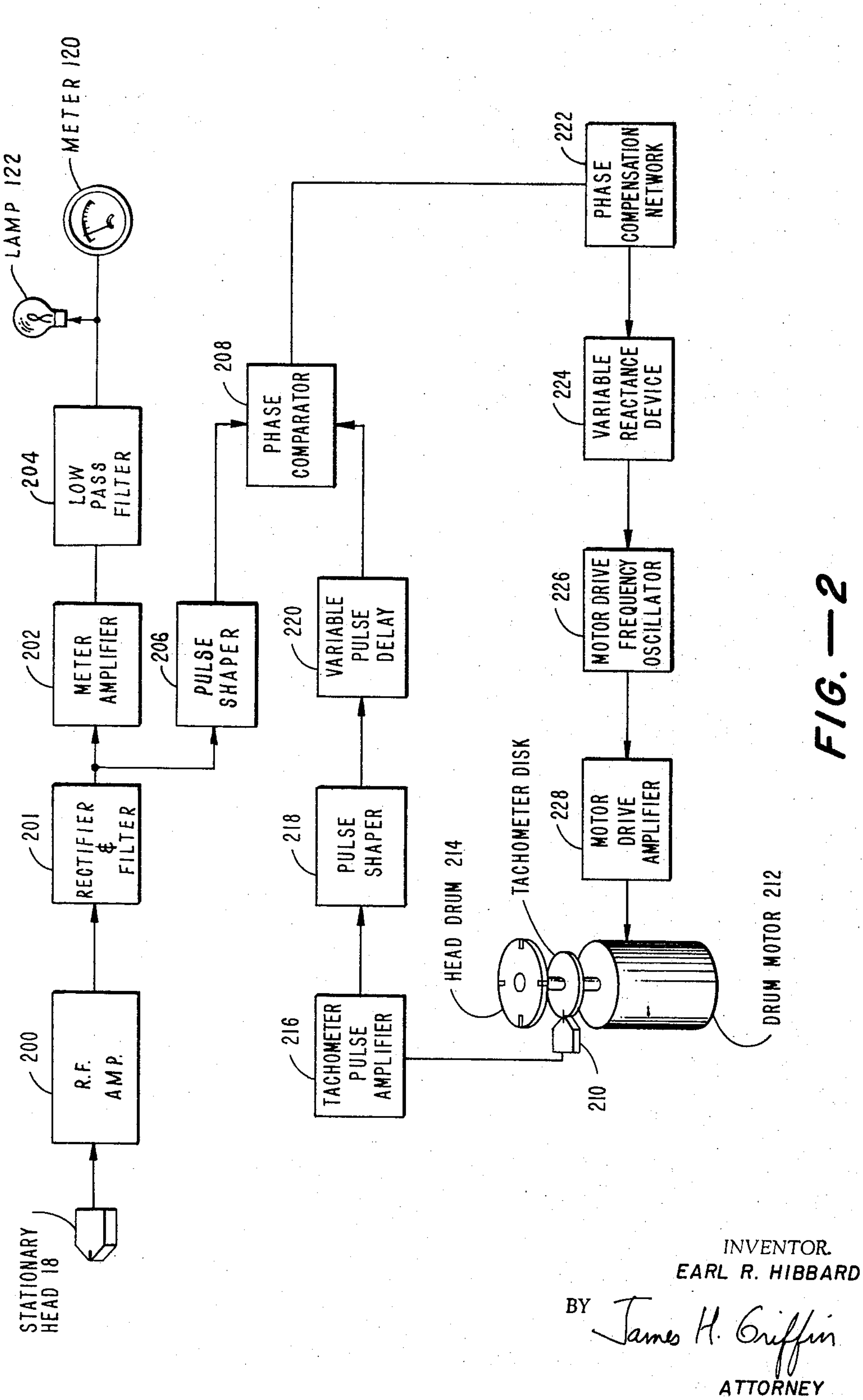
FIGURE 2 is a block diagram of an electronic system for utilizing control track signals derived according to applicant's invention.

Referring now to FIGURE 2, an electronic system for utilizing the control track signals derived according to applicant's invention begins with the stationary head 18, which transduces signals recorded on the tape 16 (by the helical scan method). The signals are pre-amplified and filtered at 200 and 201, then divided to be fed into two different systems: a "confidence sensing" or monitoring system and a servo control system. The confidence sensing system consists of a further amplification stage 202 and filtering means 204 for shaping the signal into a form suitable for use by the meter 120 or the light 122. The servo control systems begins at 206 with circuitry for shaping the signal from the rectification and filtering network 201 into a form suitable for application to a phase comparator 208. The other input to the phase comparator 208 is derived from a tachometer pickup 210. The tachometer disc is rotated by a servomotor 212 for a head drum 214 of the tape recorder. The pulses from the tachometer pickup 210 are amplified at 216, shaped at 218, and passed through a phase delay circuit 220 to the phase comparator 208. The output from the phase comparator is an error signal representing the extent that the rotation of the head drum 214 is out of phase with the signal tracks of the tape 16. After various corrections for system errors and nonlinearities are effected at 222, the signal is applied to a network 224 capable of affecting the time constant of an oscillator 226 which provides a drive frequency for controlling the drum motor 212, which is of the synchronous type. The signals from the oscillator 226 are amplified by the motor drive amplifier 228 to provide sufficient power to drive the motor 212.

Figure 3:
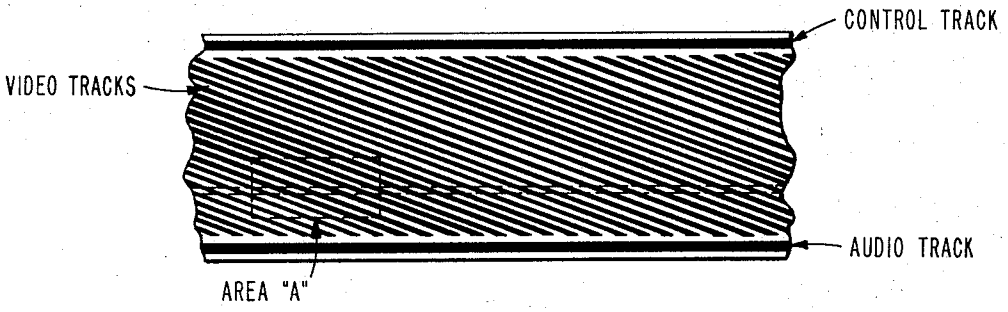
FIGURE 3 is an illustration of a portion of a helical span television tape.
Figure 4:
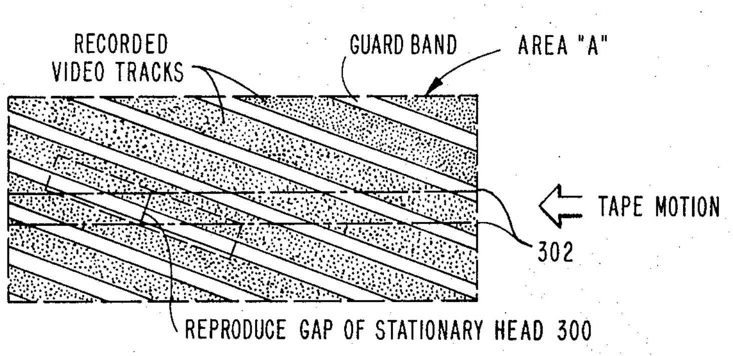
FIGURE 4 is a detailed view of a small section of the tape shown in FIGURE 3.
Figure 5:
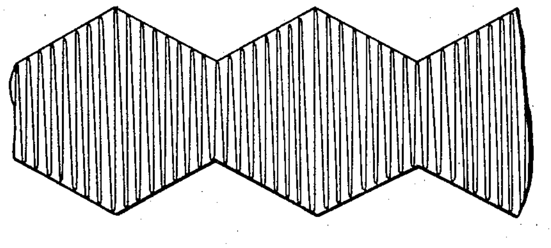
FIGURE 5 is an illustration of the RF envelope derived by a stationary head positioned on a helical scan tape recorder as shown in FIGURE 4.

FIGURE 3 shows a short section of tape used in helical scan television tape recording. The main body of the tape is covered with the helically recorded video tracks while each tape edge has a control track or audio track longitudinally recorded thereon. FIGURE 4 is the detail of a small section of the video tracks in FIGURE 3, with the position of stationary head according to applicant's invention shown at 300; the dotted lines 302 show the area that the gap 300 will scan as the tape is moved past the stationary head. FIGURE 5 shows the RF envelope that will result from the scan of the stationary head gap 300 in the area enclosed by the dotted lines 302. Of course, the recorded video carrier will be reduced in frequency at the output of the stationary head by the ratio of tape speed scanning speed times the cosine of the scanning angle. An input signal of the sort shown in FIGURE 5 is driven by the emitter-follower transistor T1 of FIGURE 1 through two amplification stages, the transistors T2 and T3 and their associated components. After passing through the rectifier and low pass filter comprising the elements 90-98, this signal may be coupled through the capacitor 99 to conventional servo control circuitry and amplified at 202 to a level proper for driving the meter 120 or the electric light bulb 122.

The above-described FIGURE 2 block diagram, showing applicant's invention incorporated for use with a head drum servo, might be used on a rotary head recorder of the helical variety. The object of the servo mechanism is to maintain synchronism of the head drum 214 with the motion of the tape in order to maintain registration between the playback head(s) and the recorded information. The phase of the head drum is indicated by the output of the tach disc transducer 210, which output is fed through the tach pulse amplifier 216, the pulse shaper 218 and variable pulse delay 220. The timing of the tach disc pulse is compared with the output of pulse shaper 206 in the phase comparator 208. The stationary head 18 provides the signal which contains the tape position information and supplies a wave form to the pulse shaper 206. The relative phases or positions of the head drum and the recorded tracks on the tape determine the output voltage of phase comparator 208. This output is given proper phase correction at 222 before it controls the motor drive oscillator 226 through the variable reactance device 224. The motor drive frequency, then, corrects any lack of registration between the head drum and the tape by speeding up or slowing down the drum motor 212. The meter amplifier 202 and the smoothing filter 204 provide indication of record current and of possible failures within the system via the lamp 122 and/or meter 120.

Referring to the schematic diagram in FIGURE 1, the circuitry operation is as follows. The passage of the tape 16 by the head 18 induces a voltage at the output of the head. This voltage is applied between ground and the base of transistor T1 in the form of a sinusoidal carrier with amplitude modulation which results from the passage of the recorded video tracks. The variable capacitor 20 and the stationary head comprise a resonant circuit tuned to the carrier frequency. The resistor 22 is a damping resistance which determines the Q and band-pass characteristics of the resonant circuit. Transistor T1 is a common collector amplifier or emitter follower which provides a high input impedance to the head and a low output impedance to the following amplifier. Resistors 38 and 39 establish the proper current bias point for transistor T1. Resistor 40 is a decoupling resistor and the capacitor 42 couples the collector to ground. The output signal of this transistor T1 is developed across the resistor 44 and fed through the coupling capacitor 56 to the base of the transistor T2, a common emitter amplifier with a biasing arrangement similar to T1. The emitter is coupled to ground through capacitor 64 and the output signal is developed across the collector load 60. This amplifier and the following one are high gain, common emitter amplifiers of similar design. The signal is fed through the capacitor 90, and the complete amplitude modulated envelope is developed across the resistor 94. The diode 98 is a half-wave rectifier which conducts only during the positive half cycles of the carrier. The resistor 96 is the rectifier load. Current impulses corresponding to the positive half cycles are supplied to the capacitor 92 via the half-wave rectifier. The combination of the capacitor 92 and the resistor 96 and the input resistance of the following amplifier comprise a filter and establish an RC time constant which maintains a charge on the capacitor 92 corresponding to just less than the peak voltage developed across the resistor 96 during each positive half cycle of the input wave form. The rectified and filtered signal which is developed across resistor 96 and capacitor 92, corresponds rather closely to the positive portion of the modulation envelope on the carrier. This voltage also contains a DC component. The signal is applied to the base of the meter amplifier. The meter amplifier is a common emitter amplifier with the meter and lamp as part of its collector load. The average magnitude of the envelope at the output of the stationary head will be indicated by both the meter and the lamp. The filter network, resistor 112 and capacitor 114, is for the purpose of filtering the envelope and applying a DC signal to the meter and lamp. Capacitor 99 is a coupling capacitor for the purpose of supplying only the AC component of the modulation to the pulse shaper.

A control track-monitor system in accordance with the schematic of FIGURE 1 and the description thereof herein was built and operated using the following components:

*Voltages*

| | |
|---|---|
| **12**—−12 v. DC | **14**—+12 v. DC |

*Transistors*

| | |
|---|---|
| T1—2N763 | T3—2N1308 |
| T2—2N1308 | T4—2N1308 |

*Diodes*

98—1N279

*Resistors (ohms)*

| | |
|---|---|
| **22**—15K | **79**—5.6K |
| **38**—47K | **80**—200 |
| **39**—47K | **84**—2.2K |
| **40**—910 | **94**—4.7K |
| **44**—3K | **96**—47K |
| **48**—1K | **106**—1K |
| **59**—5.6K | **107**—5.6K |
| **60**—2.2K | **108**—200 |
| **62**—200 | **110**—2.2K |
| **78**—1K | **112**—1K |

*Capacitors (microfarads)*

| | |
|---|---|
| **20**—$2\times10^{-3}$ | **82**—1.0 |
| **36**—.022 | **90**—0.1 |
| **42**—1.0 | **92**—.01 |
| **56**—.022 | **99**—.25 |
| **64**—1.0 | **109**—1.0 |
| **76**—.022 | **114**—1.0 |

In the above specified circuit, the head was wound w. 400 turns and was tuned to 60 kc.; the output signal was 10 volts peak-to-peak.

Thus applicant has provided a control track monitor system which can derive magnetic tape servo control signals from the actual signal recorded rather than from some special track of reference signal information. In addition, applicant's system provides monitoring of the recorded signal during the recording process, thus facilitating quick and easy adjustment of the record current supplying an immediate indication of clogged heads or like failures during recording.

A number of alternative arrangements will readily suggest themselves to those skilled in the art. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A system for deriving signals from the tape of a rotary head magnetic tape recorder comprising: a stationary playback head positioned with its gap perpendicular to the rotary-recorded tracks on said tape, a first transistor arranged in emitter-follower configuration and having emitter, base, and collector, the base of said first transistor being coupled to said stationary head, a second transistor arranged as an amplifier and having emitter, base, and collector, the base of the second transistor being coupled to the emitter of the first transistor, a third transistor arranged as an amplifier and having emitter, base, and collector, the base of the third transistor being coupled to the collector of the second transistor, a first capacitor having a first plate coupled to the collector of the third transistor, a first resistor coupled between a second plate of said first capacitor and ground, a diode having its cathode coupled to said second plate of the first capacitor, the parallel combination of a second resistor and a second capacitor coupled between the anode of the diode and ground, a fourth transistor arranged in amplifier configuration and having emitter, base, and collector, the base of the fourth transistor being coupled to the anode of the diode, a fourth resistor coupled to the collector of the fourth transistor, a third capacitor coupled between the fourth resistor and ground, and the parallel combination of a voltmeter and an electric lightbulb coupled between the fourth resistor and ground.

2. A system for deriving signals from the tape of a rotary head magnetic tape recorder comprising: a stationary playback head positioned with its gap perpendicular to the rotary-recorded track on said tape, the parallel combination of a variable capacitor and a first resistor coupled between the output lead of said head and ground, a first transistor arranged in emitter-follower configuration and having emitter, base, and collector, the base of said first transistor being coupled through a first capacitor to said stationary head, a second transistor arranged as an amplifier and having emitter, base, and collector, the base of the second transistor being coupled through a second capacitor to the emitter of the first transistor, a third transistor arranged as an amplifier and having emitter, base, and collector, the base of the third transistor being coupled to a third capacitor to the collector of the second transistor, a fourth capacitor having a first plate coupled to the collector of the third transistor, a second resistor coupled between a second plate of said fourth capacitor and ground, a diode having its cathode coupled to said second plate of the fourth capacitor, the parallel combination of a third resistor and a fifth capacitor coupled between the anode of the diode and ground, a fourth transistor arranged in amplifier configuration and having emitter, base, and collector, the base of the fourth transistor being directly coupled to the anode of the diode, a fourth resistor coupled to the collector of the fourth transistor, a sixth capacitor coupled between the fourth resistor and ground, and the parallel combination of a voltmeter and an electric lightbulb coupled between the fourth resistor and ground.

3. A system for deriving signals from the tape of a rotary head magnetic tape recorder comprising: a stationary head positioned with its gap perpendicular to the tracks on said tape, one output lead of said stationary head being grounded, the parallel combination of a variable capacitor and a first resistor coupled between the other output lead of said head and ground, a first transistor having emitter, base, and collector, the base of said first transistor being coupled through a first capacitor to said stationary head, through a second resistor to a negative power supply, and through a third resistor to ground, the emitter of said first transistor being coupled through a fourth resistor to ground, a collector of said first transistor being coupled through a fifth resistor to the negative power supply and through a second capacitor to ground, a second transistor having emitter, base, and collector, the base of the second transistor being coupled through a third capacitor to the emitter of the first transistor, through a sixth resistor to the negative power supply, and through a seventh resistor to ground, the emitter of the second transistor being coupled to an eighth resistor to the negative power supply and through a fourth capacitor to ground, the collector of the second transistor being coupled through a ninth resistor to a positive power supply, a third transistor having emitter, base, and collector, the base of the third transistor being coupled through a fifth capacitor to the collector of the second transistor, through a tenth resistor to the negative power supply, and through an eleventh resistor to ground, the emitter of the third transistor being coupled through a twelfth resistor to the negative power supply and through a sixth capacitor to ground, and the collector of the third transistor being coupled through a thirteenth resistor to ground, a seventh capacitor having a first plate coupled to the collector of the third transistor, a fourteenth resistor coupled between a second plate of said seventh capacitor and ground a diode having its cathode coupled to said second plate of the seventh capacitor, the parallel combination of a fifteenth resistor and an eighth capacitor coupled between the anode of the diode and ground, a fourth transistor having emitter, base, and collector, the base of the fourth transistor being directly coupled to the anode of the diode and being coupled through a sixteenth resistor to the negative power supply and through a seventeenth resistor to ground, the emitter of the fourth transistor being coupled through an eighteenth resistor to be negative power supply and through a ninth capacitor to ground, the collector of the fourth transistor being coupled through a nineteenth resistor to the positive power supply, a twentieth resistor coupled to the collector of the fourth transistor, a tenth capacitor coupled between the twentieth resistor and ground, and the parallel combination of a voltmeter and an electric lightbulb coupled between the twentieth resistor and ground.

References Cited

UNITED STATES PATENTS

| | | | |
|---|---|---|---|
| 3,002,154 | 9/1961 | Schmitz et al. | 324—119 |
| 3,009,108 | 11/1961 | Breuning | 324—120 |
| 3,086,089 | 4/1963 | Lyon | 179—100.2 |
| 3,225,135 | 12/1965 | Osawa et al. | 179—100.2 |

TERRELL W. FEARS, *Primary Examiner.*

BERNARD KONICK, *Examiner.*

J. R. GOUDEAU, *Assistant Examiner.*